(12) United States Patent
Saini et al.

(10) Patent No.: US 8,439,698 B1
(45) Date of Patent: May 14, 2013

(54) LOW PROFILE MECHANICAL AND ELECTRICAL ACCESSORY CONNECTOR

(76) Inventors: Amrinder Pal Singh Saini, Union City, CA (US); Troy Hulick, Saratoga, CA (US); Benjamin Rosete, Fremont, CA (US)

(*) Notice: Subject to any disclaimer, the term of this patent is extended or adjusted under 35 U.S.C. 154(b) by 297 days.

(21) Appl. No.: 12/815,904

(22) Filed: Jun. 15, 2010

(51) Int. Cl.
*H01R 13/627* (2006.01)
(52) U.S. Cl.
USPC ........ 439/358; 439/108; 439/378; 361/679.41
(58) Field of Classification Search ............... 439/342, 439/352, 924.1, 357–358, 378, 95, 108; 361/679.41, 361/679.43
See application file for complete search history.

(56) References Cited

U.S. PATENT DOCUMENTS

| | | | | |
|---|---|---|---|---|
| 3,611,261 | A | * | 10/1971 | Gregory ..................... 439/353 |
| 5,187,744 | A | | 2/1993 | Richter |
| 5,454,734 | A | * | 10/1995 | Eggert et al. ................ 439/578 |
| 5,557,562 | A | * | 9/1996 | Yoshiharu et al. ....... 361/679.41 |
| 5,677,827 | A | | 10/1997 | Yoshioka et al. |
| 5,788,202 | A | | 8/1998 | Richter |
| 5,961,337 | A | * | 10/1999 | Kordes ......................... 439/141 |
| 5,997,323 | A | | 12/1999 | Youn |
| 6,029,940 | A | | 2/2000 | Klein |
| 6,114,958 | A | * | 9/2000 | Murphy ..................... 340/568.1 |
| 6,233,141 | B1 | | 5/2001 | Lee et al. |
| 6,474,823 | B1 | * | 11/2002 | Agata et al. .................... 362/26 |
| 6,488,514 | B2 | * | 12/2002 | Kubo et al. .................... 439/108 |
| 6,494,734 | B1 | * | 12/2002 | Shuey ......................... 439/378 |
| 6,530,784 | B1 | * | 3/2003 | Yim et al. ...................... 439/31 |
| 6,585,212 | B2 | | 7/2003 | Carnevali |
| 6,817,587 | B2 | | 11/2004 | Lin |
| 6,848,662 | B2 | | 2/2005 | Paramonoff et al. |
| 7,032,872 | B2 | | 4/2006 | Sullivan |
| 7,142,421 | B2 | * | 11/2006 | Cheng et al. ............. 361/679.57 |
| 7,150,634 | B2 | * | 12/2006 | Kamata et al. ................. 439/95 |
| 7,164,578 | B2 | | 1/2007 | Wang et al. |
| 7,256,990 | B2 | * | 8/2007 | Grunow et al. .......... 361/679.41 |
| 7,286,344 | B2 | * | 10/2007 | Kim ........................ 361/679.41 |
| 7,551,458 | B2 | | 6/2009 | Carnevali |
| 7,857,541 | B2 | | 12/2010 | Gong |
| 2005/0047104 | A1 | | 3/2005 | Grunow et al. |
| 2006/0138784 | A1 | | 6/2006 | Wang et al. |

OTHER PUBLICATIONS

Non-Final Office Action for U.S. Appl. No. 12/418,387, mailed on May 22, 2012, Troy Hulick et al., "Accessory Attachment Mechanism", 6 pages.

Final Office Action for U.S. Appl. No. 12/418,387, mailed on Feb. 7, 2012, Troy Hulick et al., "Accessory Attachment Mechanism", 12 pages.

* cited by examiner

*Primary Examiner* — Xuong Chung Trans
(74) *Attorney, Agent, or Firm* — Lee & Hayes, PLLC (57) ABSTRACT

Accessories are attached to an electronic device, such as an electronic book ("eBook") reader device via one or more low profile accessory connectors configured to provide mechanical and electrical connections. Accessories include covers, reading lights, external power sources, touchpads, diagnostic devices, and so forth. The low profile accessory connector is configured to receive a hook from the accessory and provide a mechanical engagement between the hook and the electronic device. While engaged, at least a portion of the hook engages one or more electrical contacts within the connector. Electrical power, signals, or both may then be sent between the accessory and the electronic device.

32 Claims, 12 Drawing Sheets

LOW PROFILE MECHANICAL AND ELECTRICAL ACCESSORY CONNECTOR

BACKGROUND

Electronic devices, such as electronic book readers ("eBook readers"), cellular telephones, personal digital assistant (PDA), portable media players, tablet computers, netbooks, and the like, may attach to multiple different types of accessories. These accessories attach to electronic devices to add functions and enhance aesthetics of the devices. However, traditional connectors suitable for portable electronic devices are typically not available in low-profile form factors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Electronic devices, such as electronic book ("eBook") reader devices, are used in a variety of situations, ranging from a casual reader sitting in her living room to students in a classroom. Accessories add features and functionality to an eBook reader device. Some accessories, such as a cover, may be completely passive and may mechanical attach to a device, such as an eBook reader device. Active accessories, meanwhile, may consume or provide electrical power, process data, and so forth. These active accessories may mechanically and/or electrically attach to the eBook reader device. For example, active accessories may include a reading or task light, a solar panel, an external power source such as battery, an external input device such as a touchpad, a diagnostic device, and so forth.

Traditional accessory connectors for portable electronic devices may provide mechanical or electrical couplings, but not both. Furthermore, traditional accessory connectors do not provide for mechanical and electrical coupling in the same low-profile connector.

This disclosure describes, in part, an accessory connector mechanism configured to provide mechanical and electrical coupling between a portable electronic device and an external accessory. The accessory may be passive or active.

In one implementation, the accessory may couple to a portable device, such as an eBook reader device, via an engagement member such as a first hook and a second hook, each of which engages a complementary slot or receptacle in the eBook reader device. Engagement of both hooks in this manner achieves mechanical and electrical coupling between the accessory and the eBook reader device. In some implementations, the first hook may be barbed, while the second hook may be arcuate. One such arrangement is described in more detail in the pending U.S. patent application Ser. No. 12/418,387 entitled "Accessory Attachment Mechanism" filed Apr. 3, 2009.

A power and data provisioning module is configured to determine when an active device coupled to the electronic device requires or requests power connectivity, data connectivity, both, or neither. In some instances, the device may provide power to the engaged accessory, while in other instances the device may receive power from the engaged accessory. In still other instances, both the device and the engaged accessory provide power to one another over time.

Additionally or alternatively, the electrical coupling between the device and the accessory may also include pathways suitable for data communication. The data communication may comprise an RS-232 serial binary connection, serial peripheral interface (SPI) bus, universal serial bus (USB), parallel bus, and so forth.

Contacts are disposed within the first and second slots or receptacles of the eBook reader device. Complementary electrical conductors may be disposed upon the first, second, or both hooks such that when engaged, an electrical connection is formed with the contacts within the slots.

While this overview is described in terms of an eBook reader device, the concepts described herein may also be applicable to cellular telephones, portable media players, laptops, tablet computers, netbooks, personal digital assistants, or other portable electronic devices and their accessories which may be portable or stationary.

Illustrative Device and Accessory

Figure 1:
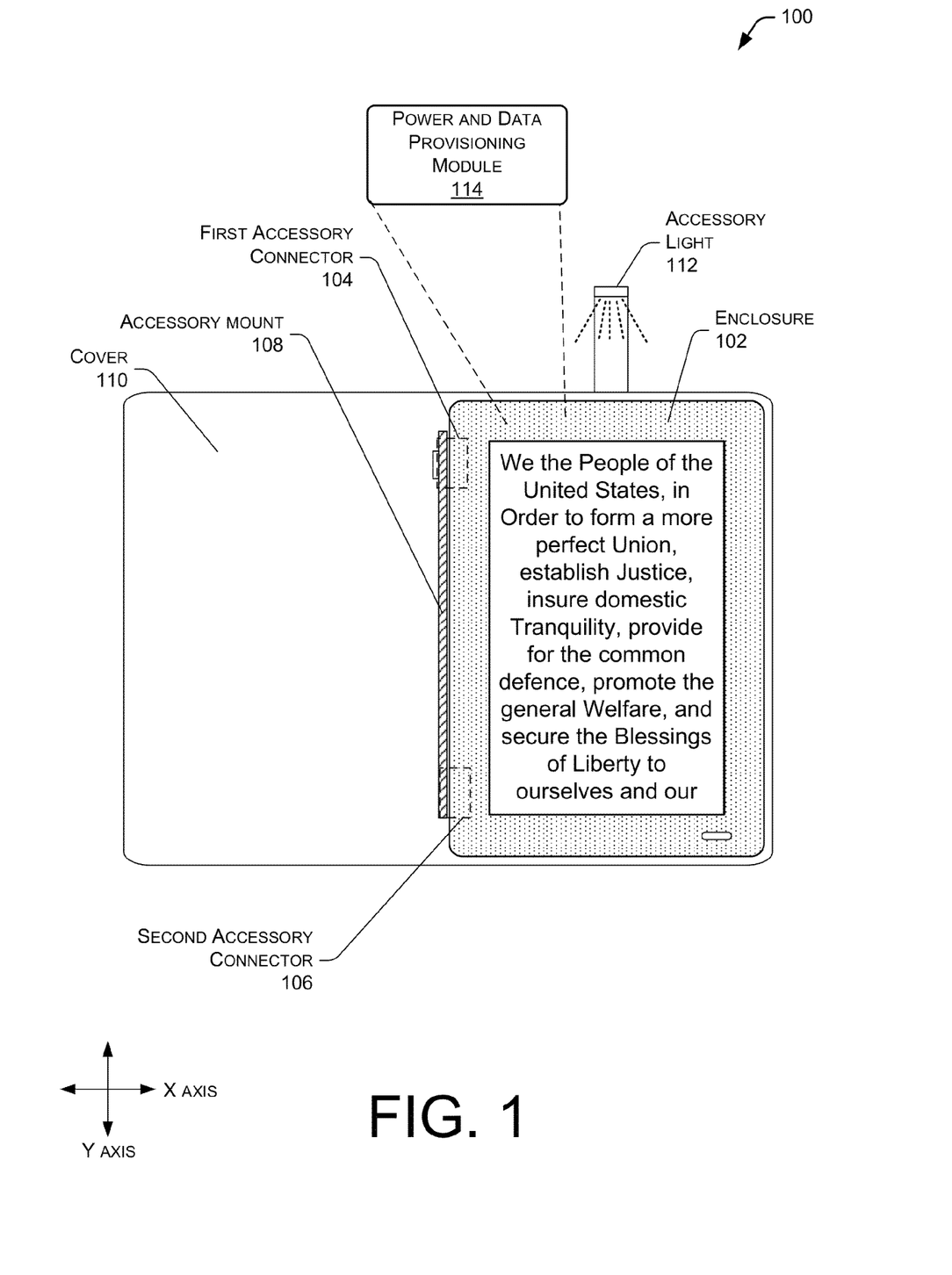
FIG. 1 depicts an illustrative electronic book (eBook) reader device having a first and a second attachment connector with an accessory cover attached. Here, the accessory cover includes a light for the eBook reader device.

FIG. 1 depicts an illustrative electronic book (eBook) reader device 100. The eBook reader device 100 as shown comprises an enclosure 102, which contains the internal components of the device, such as a processor, a memory, a display, and so forth as described below with regards to FIG. 2. First and second accessory connectors 104 and 106 attach to or mount within the enclosure 102. While FIG. 1 illustrates two connectors, the device 100 may include a single accessory connector or three or more accessory connectors in other implementations.

FIG. 1 also illustrates an accessory mount 108, which is configured to engage the first accessory connector 104 and the second accessory connector 106 and mechanically and/or electrically couple the connectors to the enclosure 102 and components therein. The accessory mount may comprise a body which may include an integral or attached accessory. For example, a cover 110 and an accessory light 112 attach to the accessory mount 108. The accessory light 112 may be configured to provide, when activated, light for reading or for performing other tasks. While this FIG. 1 illustrates accessories that include a cover and a light, other implementations may employ other types of accessory devices.

In some implementations, the active accessory may detachably couple to the body of the accessory mount. The accessory mount may in turn detachably couple to the device 100. Thus, the accessory mount may act as an intermediary and allow sharing of active accessories across devices 100 having different mounting requirements.

In addition, the eBook reader device 100 also includes a power and data provisioning module 114. The power and data provisioning module 114 is configured to direct power, data, or both to the one or more accessories coupled to the eBook reader device 100. For example, the power and data provisioning module 114 may detect that an active accessory requiring power is coupled to the device by monitoring continuity between a ground connector and a detect connector within a slot or receptacle. An active accessory may be configured with a hook complementary to the connectors such that, upon engagement, the ground and detect connectors are shorted. This short may be used by the power and data provisioning module 114 to establish that an active accessory is attached. While one example has been discussed, the module 114 may detect the presence of one or more accessories in other similar or different manners.

Figure 2:
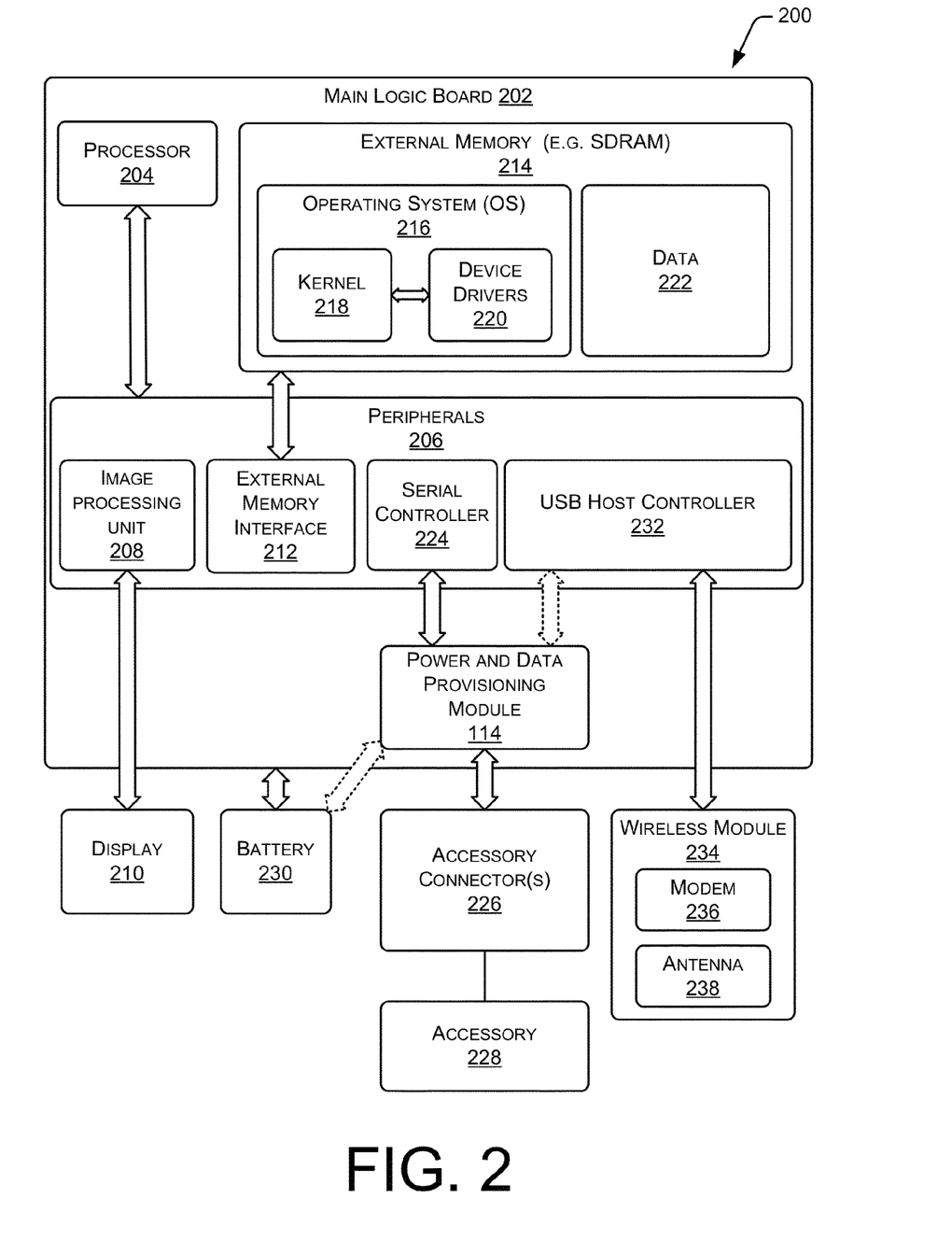
FIG. 2 is an illustrative schematic of an electronic device showing selected components.

FIG. 2 is an illustrative schematic 200 of an electronic device, such as the eBook reader device 100, showing selected components. In a very basic configuration, the device 100 includes a backplane such as a main logic board 202 comprising components, such as a processor 204 and one or more peripherals 206. Each processor 204 may itself comprise one or more processors. The backplane may comprise a printed circuit board or other substrate to which one or more components affix.

Peripherals 206 may couple to the processor 204. In some implementations, at least some of the peripherals 206 reside on the main logic board 202. FIG. 2 illustrates that an image processing unit 208 on the main logic board 202 couples to one or more display components 210 (or "displays"). In some implementations, multiple displays may be present and may couple to the image processing unit 208. Furthermore, one or more image processing units 208 may couple to the multiple displays.

Display 210 may present content in a human-readable format to a user. The display 210 may be reflective, emissive, or a combination of both. Reflective displays utilize incident light and include electrophoretic displays ("EPD"), interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

The content presented on the display 210 may take the form of electronic books or "eBooks." For example, the display 210 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form. Additionally or alternatively, the display may present any other form of content, including audio and/or video.

The display 210 may further include touchscreen capabilities that allow user input through contact or gesturing relative to the display 210. For convenience only, the display 210 is shown in a generally rectangular configuration. However, it is understood that the display 210 may be implemented in any shape, and may have any ratio of height to width. Also, for stylistic or design purposes, the display 210 may be curved or otherwise non-linearly shaped. Furthermore, the display 210 may be flexible and configured to fold or roll.

The eBook reader device 100 may have an input device controller configured to accept input from one or more user actuable controls. These user actuable controls may include a keypad, a keyboard, a joystick, a touch sensor (that may be a touchpad or incorporated into a display to form a touchscreen), and so forth. These user actuable controls may have dedicated or assigned operations. For instance, the actuable controls may include page turning buttons, a joystick, navigational keys, a power on/off button, selection keys, touch sensor, and so on. The user controls may be located on the main logic board 202, on other circuit boards or structures within the eBook reader device 100, or as part of the accessory.

FIG. 2 further illustrates that an external memory interface ("EMI") 212 couples to an external memory 214. The EMI 212 manages access to data stored in external memory 214. The external memory 214 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media. The external memory 214 may reside on the main logic board 202 as shown, on another circuit board, or on a combination of the two.

The external memory 214 may store an operating system 216 comprising a kernel 218 operatively coupled to one or more device drivers 220. As illustrated, the device drivers 220 operatively couple to the peripherals 206. The external memory 214 may also store data 222, which may comprise content objects for consumption on the eBook reader device 100, executable programs, databases, user settings, configuration files, device status, and so forth.

A serial controller 224 is configured to provide serial communications to accessory devices. The serial controller 224 may support serial busses and protocols such as RS-232, SPI, and so forth. In some implementations, parallel or other communication formats may be supported. Accessory devices utilizing data communication may include touchpads, mice, input devices, diagnostic devices and terminals, and so forth. The serial controller 224 is configured to provide data communication via the plurality of contacts present in the one or more accessory connectors. For example, a diagnostic device may couple to the serial controller 224 via electrical contacts within the second accessory connector 106 for testing and checkout of the eBook reader device 100, such as during assembly or repair operations.

The power and data provisioning module 114 introduced with reference to FIG. 1 may couple to the serial controller 224. As described above, the power and data provisioning module 104 is configured to direct power, data, or both to or from an accessory 228 via one or more accessory connectors 226. The accessory connectors 226 may comprise the first accessory connector 104, the second accessory connector 106, and so forth.

The eBook reader device 100 may incorporate one or more batteries 230 to provide electrical power while not connected to an external power supply. A "battery," as used herein, includes components capable of storing or providing power to an electronic device, including lithium polymer batteries, ultracapacitors, fuel cells, and so forth. When an active accessory is connected, the power and data provisioning module 114 may provide electrical power from the battery 230 to the accessory 228 via the accessory connectors 226.

A USB host controller 232 may also reside on the main logic board 202. The USB host controller 232 manages communications between devices attached to a universal serial bus ("USB") and the processor 204 and other peripherals. In some implementations, the USB host controller 232 may couple to the power and data provisioning module 114 such that a USB connection may be available at the accessory connector(s) 226.

The USB host controller 232 may couple to a wireless module 234 via the universal serial bus. The wireless module 234 may allow for connection to wireless local or wireless wide area networks ("WWAN"). The wireless module 234 may include a modem 236, configured to send and receive data wirelessly, and one or more antennas 238, suitable for propagating a wireless signal. In other implementations, a wired network interface may be provided.

Furthermore, eBook reader device 100 may include one or more other, non-illustrated peripherals. These peripherals may include an audio module, a hard drive using magnetic, optical, or solid state storage to store information, a firewire bus, a Bluetooth™ wireless network interface, a camera, a global positioning system, a PC Card component, and so forth.

Couplings, such as that between kernel 218 and device drivers 220, are shown for emphasis. There are couplings between many of the components illustrated in FIG. 2, but graphical arrows are omitted for clarity of illustration.

Figure 3:
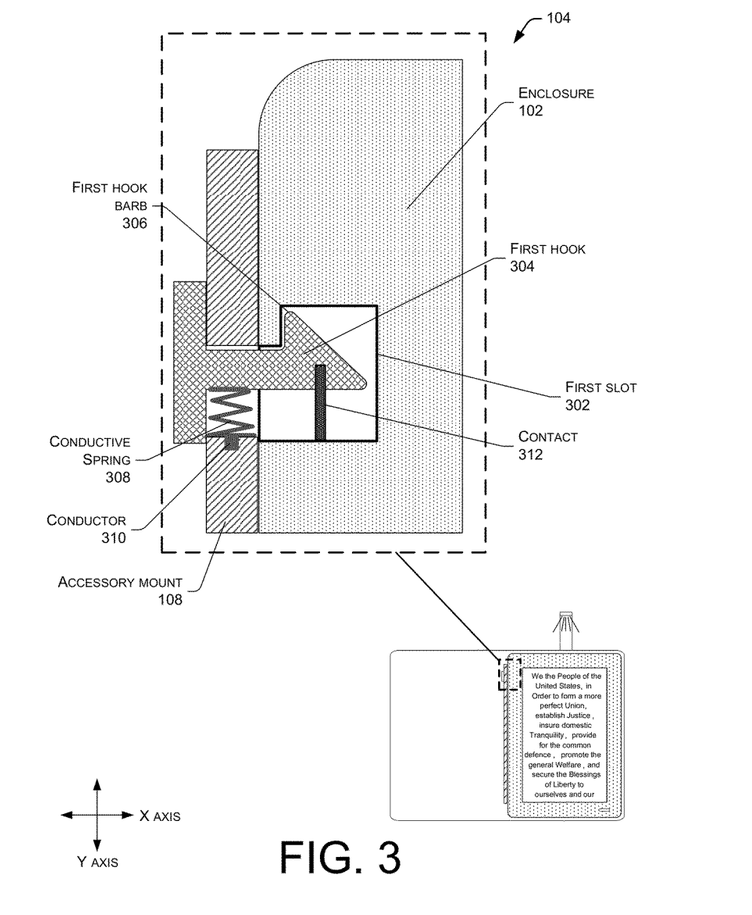
FIG. 3 depicts an enlarged cutaway view of the first accessory connector of the eBook reader device of FIG. 1.

FIG. 3 depicts an enlarged cutaway view 300 of the first accessory connector 104 of the eBook reader device 100 of FIG. 1. This cutaway view from above illustrates a first slot 302 or receptacle, which is configured to accept a first engagement member attached to the accessory mount 108. The accessory mount 108 in turn is coupled to one or more accessories 228, such as the cover 110 and accessory light 112. As shown here, in some implementations, the first engagement member may comprise a first hook 304. A connector body incorporating the first slot 302 may comprise metal, a glass-reinforced plastic, a ceramic, and so forth. The first hook 304 is movably engaged with the accessory mount 108 and includes a button for actuation by a user. The first hook 304, as shown, incorporates a first hook barb 306, configured to engage at least a portion of the first slot 302. In other implementations the first hook 304 may utilize another feature configured to provide mechanical engagement with the first slot 302, or a portion thereof.

At least a portion of the first hook 304 may be configured to provide an electrical pathway. For example, the first hook 304 may comprise a conductive material, may be plated with a conductor, and so forth. A conductive spring 308, wire, contact, flexible printed circuit, or other electrical connection provides an electrical pathway from the conductive material of the first hook 304 to a conductor 310. Conductor 310 in turn couples to one or more active devices in the accessory 228. The same or an additional spring (or other flexible material) may be configured to bias the first hook 304 to a latched position when a user is not applying pressure to the first hook 304.

A contact 312 is disposed within the first slot 302 and configured to couple with at least a part of the conductive portion of the first hook 304. An outline of the contact 312 is shown with a broken line within the area of the first hook 304. In some implementations, the contact 312 may be disposed to touch the top, bottom, or sides of the first hook 304. Once coupled, an electrical pathway, suitable for carrying electrical power, data signals, and so forth, is established between the eBook reader device 100 and the accessory 228. A single conductive pathway may be provided, as shown in this illustration. In other implementations additional conductive pathways on the first hook 304 and corresponding additional contacts in the first slot 302 may be provided. In some implementations where the first accessory connector 104 is configured to provide mechanical support only, the contact may be omitted from the first accessory connector 104.

Figure 4:
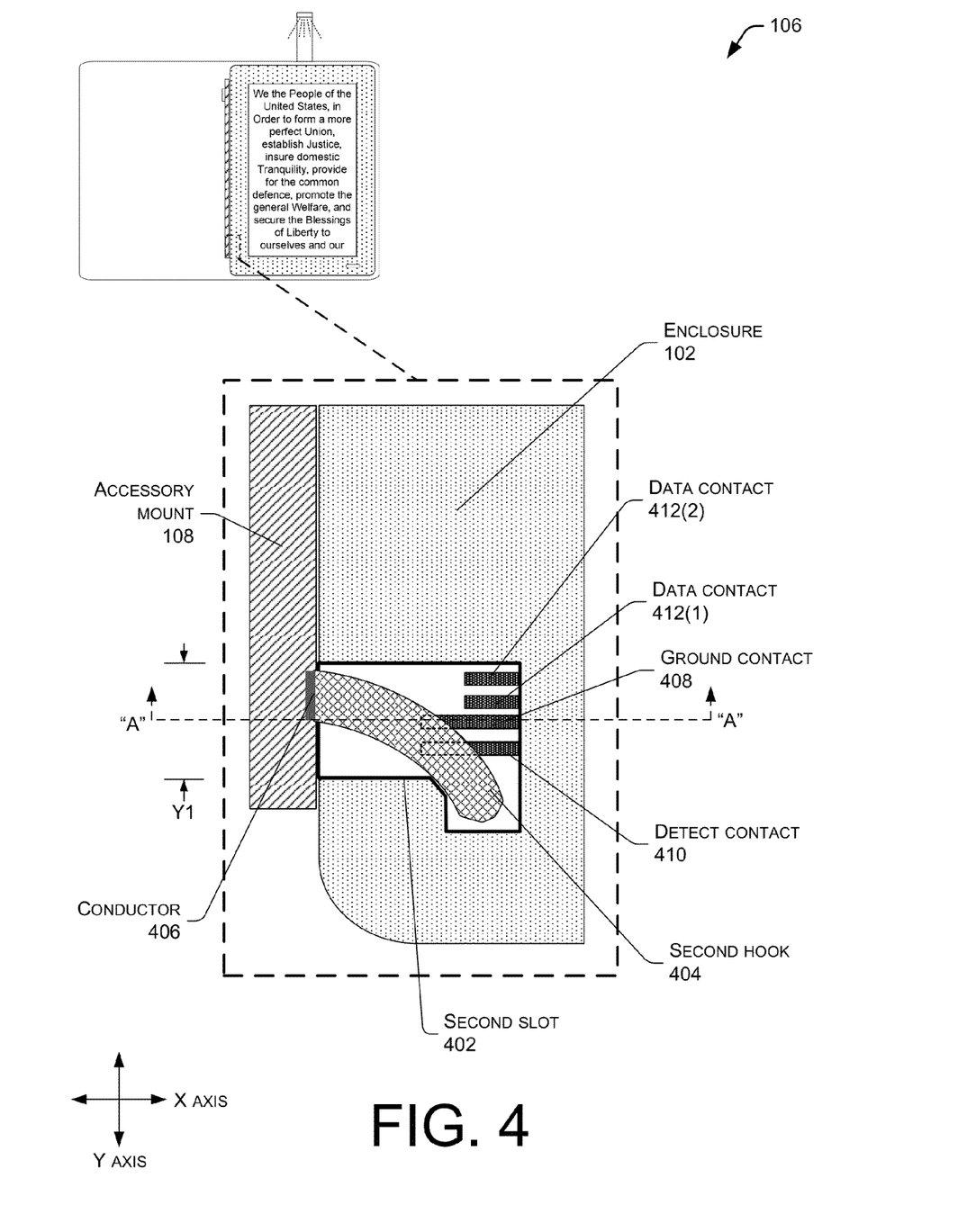
FIG. 4 depicts an enlarged cutaway view of the second accessory connector of the eBook reader device of FIG. 1 with an engaged curved hook.

FIG. 4 depicts an enlarged cutaway view 400 of the second accessory connector 106 of the eBook reader device 100 of FIG. 1. In this cutaway view from above, a second slot 402 or receptacle is configured to accept a second engagement member attached to the accessory mount 108. The second slot 402 may have a width as shown by line Y1 of about eight millimeters in one implementation. The accessory mount 108 in turn is coupled to one or more accessories 228, such as the cover 110 and accessory light 112. As shown here, in some implementations, the second engagement member may comprise an arcuate second hook 404. A connector body incorporating the second slot 402 may comprise metal, a glass-reinforced plastic, ceramic, and so forth. As shown here, the second hook 404 may fixedly engage to the accessory mount 108. In some implementations, the second hook 404 may be configured to be moveably engaged to the accessory mount 108.

The second hook 404 is configured to provide mechanical coupling, electrical coupling, or both between the accessory 228 and the eBook reader device 100. To provide for the electrical coupling, at least a portion of the first hook 304 may comprise or may be plated with a conductive material. The conductive material provides an electrical pathway from contacts within the second slot 402 to a conductor 406. This conductor 406 in turn couples with one or more active components within the accessory 228.

One or more electrical contacts may also reside within the second slot 402. These contacts may comprise spring contacts, wiper contacts, and so forth. For instance, these contacts may include a ground contact 408, a detect contact 410, and data contacts 412(1), 412(2), . . . , 412(D). Data contacts 412(1)-(D) may comprise data transmit and data receive pathways or lines. While this figure illustrates two data contacts 412(1), 412(2), other implementations may employ a fewer or greater number of data contacts. This illustration shows outlines of the contacts with broken lines within the area of the second hook 404. Specific contacts, such as the ground contact 408 and the detect contact 410, may be configured with a geometry differing from the data contacts 412(1)-(D). For example, and as illustrated, the ground contact 408 and the detect contact 410 are longer and extend such that each is configured to engage substantially simultaneously the second hook 404, when the second hook 404 is present. Meanwhile, the data contacts 412(1)-(D) are shorter and, as such, do not engage the second hook 404. In some implementations, the ground contact 408 may be configured to engage the second hook 404 before other contacts to provide a conductive path to minimize the effects of electrostatic discharge.

In other implementations, the contacts may be disposed on other surfaces of the slot 402. For example, two contacts may be disposed above the second hook 404 and may be configured to engage conductors disposed on the complementary proximate surface, while two contacts reside below the second hook 404 as shown in FIG. 4.

Figure 5:
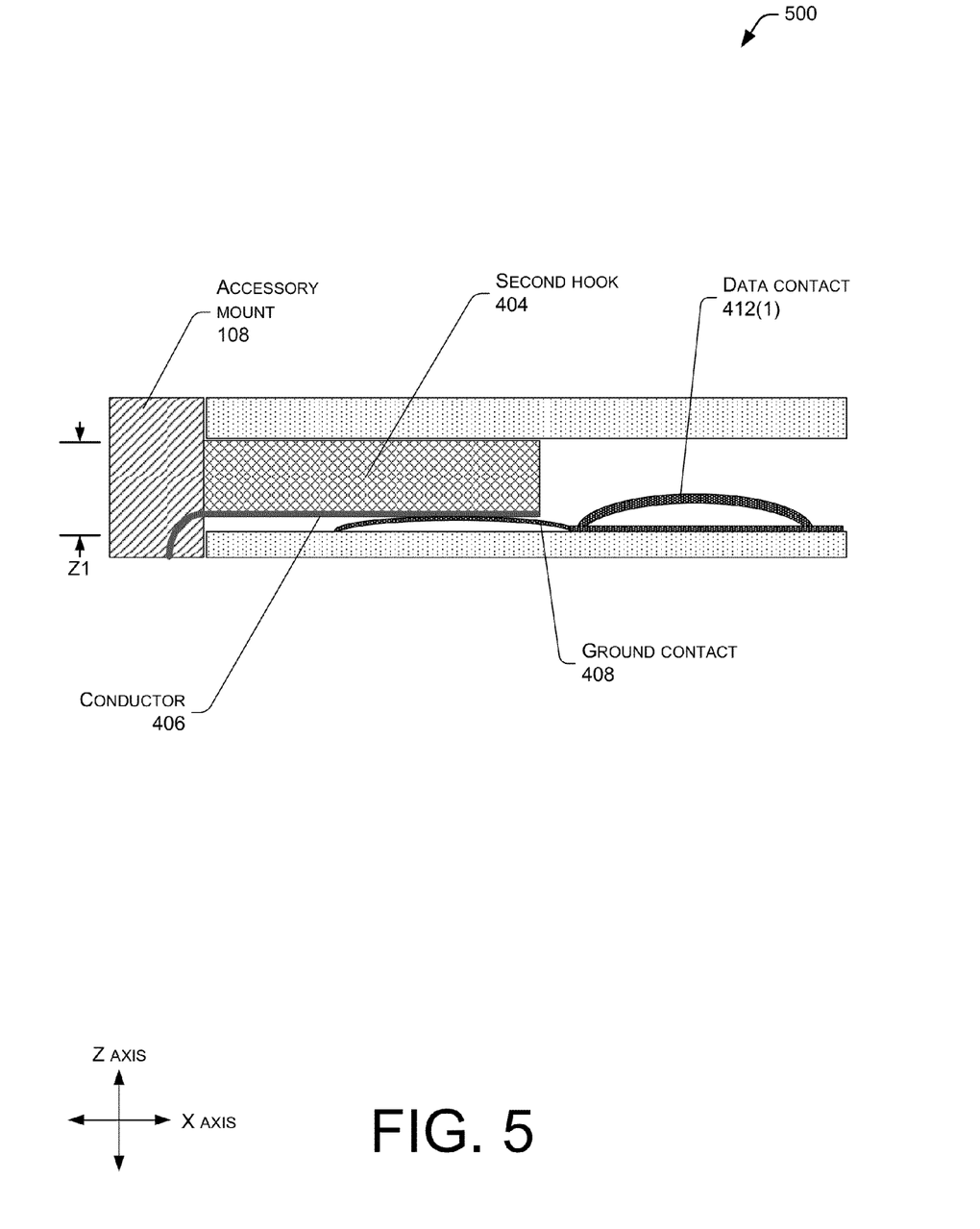
FIG. 5 illustrates an enlarged cross section of the second accessory connector of the eBook reader device of FIG. 1.

FIG. 5 illustrates an enlarged cross section of the second accessory connector 106 of FIG. 4 along line A—A. This cross section illustrates the body of the second hook 404. A conductor 406 resides on a surface of the second hook 404 and proximate to the ground contact 408 in this example. As shown here, the conductor 406 comprises a coating or layer upon the second hook 404. However, in some implementations the second hook 404 may itself comprise a suitably conductive material, such as aluminum, conductive plastic, and so forth. As shown here, the contacts (such as the ground contact 408) comprise spring contacts. Upon engagement, the second hook 404 depresses the detect contact 410 and provides at least an electrical coupling. As mentioned above, the data contacts 412(1) and 412(2) are not configured to engage the second hook 404. In some implementations, the contacts may be of the same or similar geometry to one another, while in other implementations they may not.

In another implementation, a plurality of conductors 406 may be disposed upon the second hook 404 such that only specific contacts within the second slot 402 couple to each of the plurality of conductors once the second hook 404 is fully engaged. Thus, the second hook 404 may carry electrical signals as well as power.

The illustrated accessory connectors 226 comprise very low profiles. For instance, the height of the second slot 402 as shown by line Z1 may be about less than 1 millimeter (e.g., 0.81 millimeters) in one implementation. The illustrated example thus provides a compact and low-profile device and accessories utilizing the combined mechanical and electrical coupling.

Figure 6:
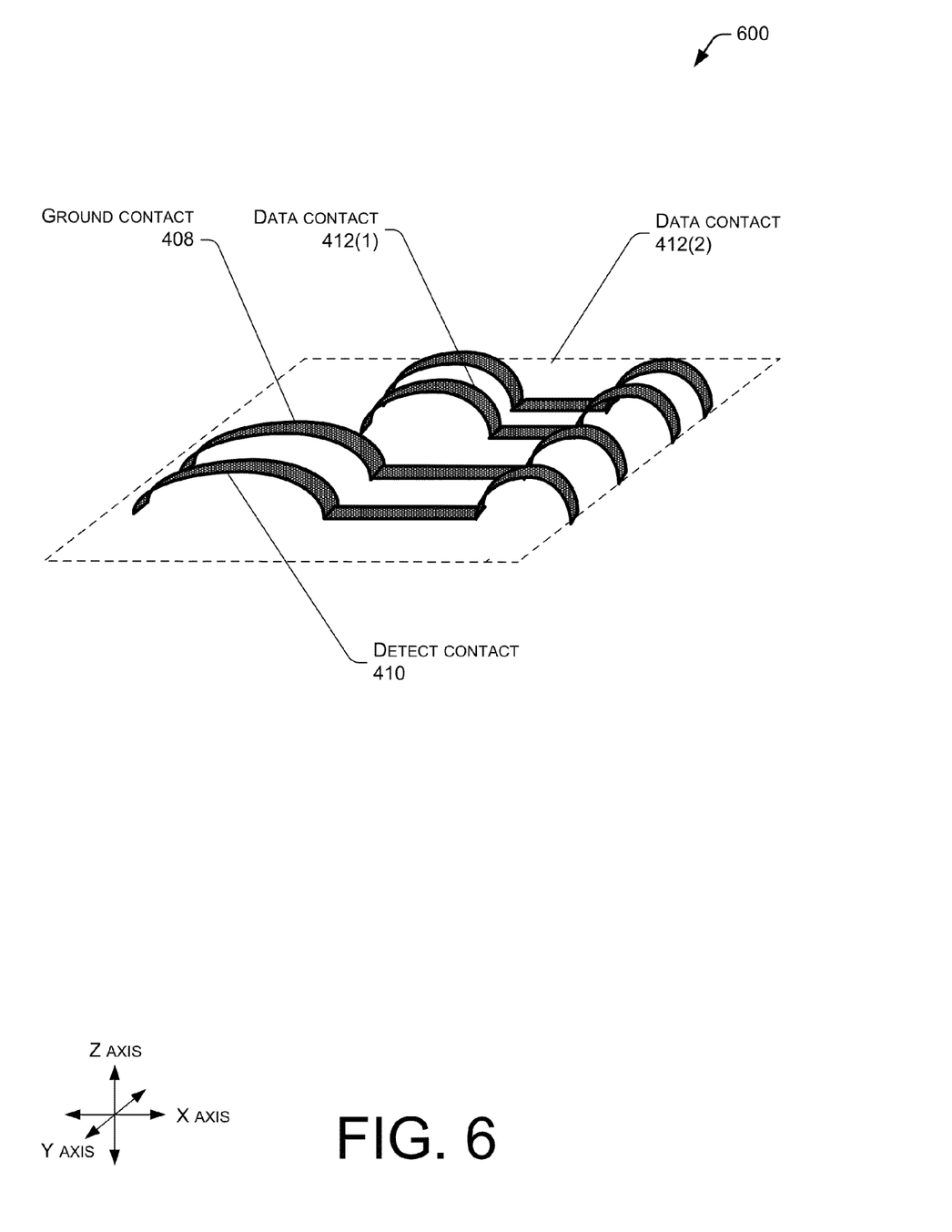
FIG. 6 illustrates a perspective view of contacts within the second accessory connector.

FIG. 6 illustrates a perspective view 600 of contacts within the second accessory connector 106. As described above, contacts may differ in geometry from one another, or they may not. For example, and as illustrated, the ground contact 408 and the detect contact 410 are longer than the data contacts 412(1)-(2) along the "X" axis. Thus, as shown above with regards to FIG. 4, the second hook 404 couples to the ground contact 408 and the detect contact 410 when the second hook 404 is fully engaged. However, the data contacts 412(1)-(2) remain uncoupled in this example. While the width and height of the contacts is depicted as approximately the same, in some implementations each of these dimensions may vary from one contact to another.

Figure 7A:
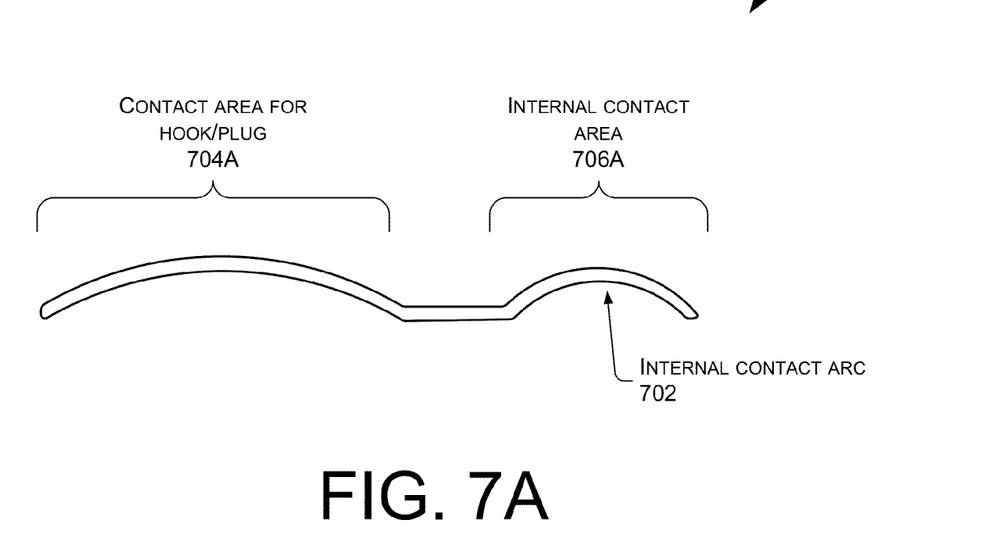
FIGS. 7A and 7B collectively illustrate cross sections of two contact configurations.
Figure 7B:
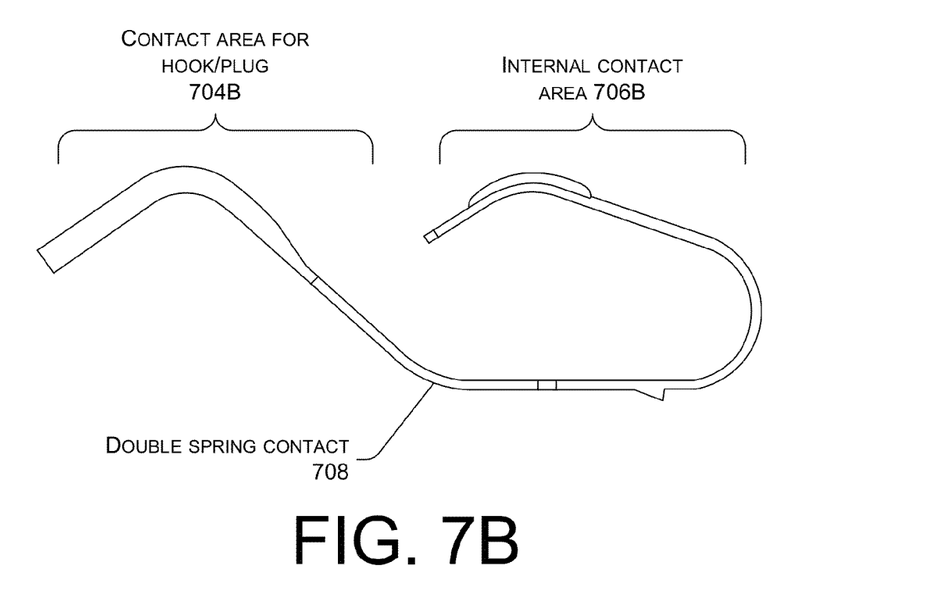

FIGS. 7A and 7B each illustrate a cross section 700 of a spring contact configuration. Spring contacts may be comprised of resilient materials, such as metal or plastic, and a conductive material. These materials may be of a generally elliptical cross section, such as spring wire, a rectangular cross section such as in a leaf spring, and so forth. For example, a spring contact may have a nickel base with a gold coating, although multiple other combinations are similarly possible.

FIG. 7A illustrates a double arc contact having an arcuate contact area 704A for coupling with the hook or a plug, while an internal contact area 706A comprises a second arcuate internal contact arc 702. The internal contact arc 702 may couple to the power and provisioning module 114 via an electrical pathway or to another component within the eBook reader device 100 via spring contact, soldering, adhesive, and so forth.

FIG. 7B, meanwhile, illustrates a double spring contact 708. The double spring contact 708 comprises a generally wave-like cross section having an arcuate contact area 704B for coupling with the hook or plug, as well as an arcuate internal contact area 706B. The double spring contact 708 may be utilized in situations where the power and provisioning module 114 couples to the accessory connector body via contact. Thus, rather than soldering, conductive adhesives, or adding a spring contact to another component, an accessory connector using the double spring contact 708 may be emplaced and, upon assembly, a conductive trace on a complementary component establishes an electrical pathway.

Connected Accessories

Figure 8:
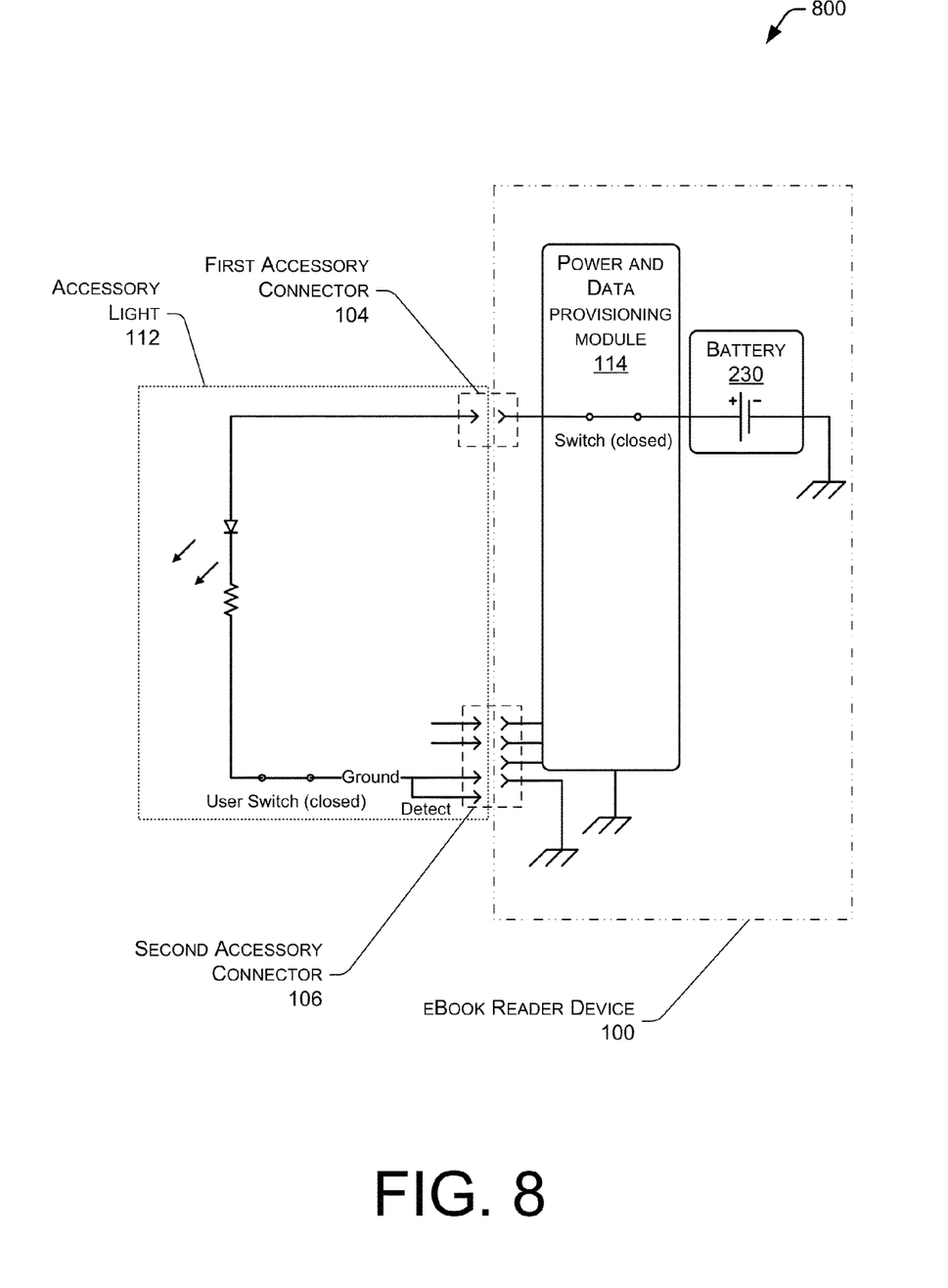
FIG. 8 is an illustrative schematic of the accessory cover of the eBook reader device of FIG. 1.

FIG. 8 is an illustrative schematic 800 of the accessory light 112 within the cover 110 of the eBook reader device 100 of FIG. 1. The accessory light 112 is configured to use power from the eBook reader device 100, but does not require data connectivity. The power and data provisioning module 114 senses the short between the ground contact 408 and the detect contact 410 by the second hook 404. As a result, the power and data provisioning module 114 provides power to the first accessory connector 104. Power thus flows between the battery 230 within the eBook reader device 100 via the first accessory connector 104 to the lighting elements, such as light emitting diodes (LEDs) in the accessory light 112. The second accessory connector 106, meanwhile, provides a ground connection for the accessory light 112. While FIG. 8 illustrates one example accessory, other implementations may employ other any other type of active accessory, such as a battery charger, secondary device, additional display, solar panel, and so forth.

Figure 9:
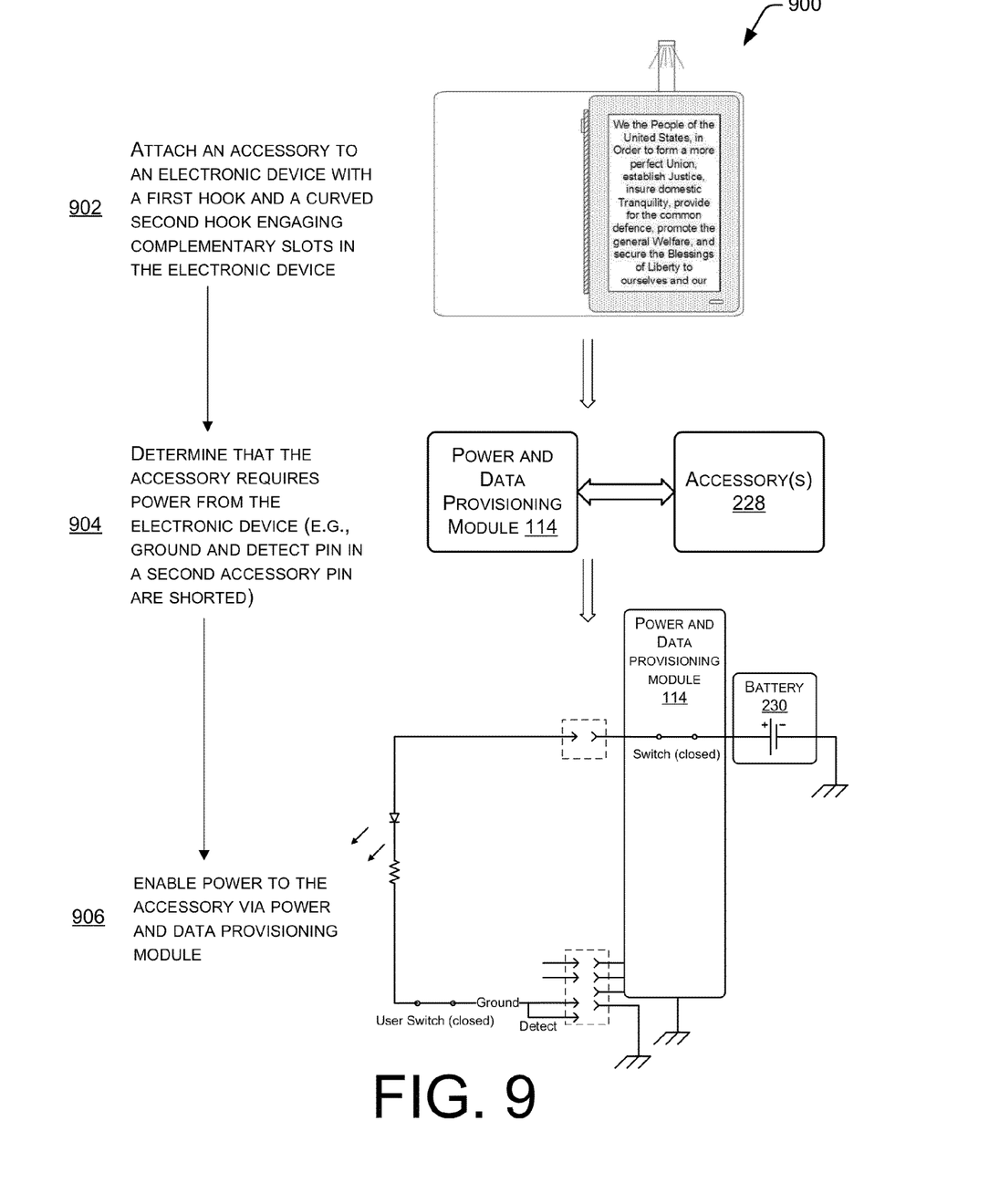
FIG. 9 is an illustrative process of attaching an accessory to the eBook reader device of FIG. 1 and providing power to the accessory.

FIG. 9 is an illustrative process 900 of attaching the active accessory such as the accessory light 112 to an portable electronic device, such as the eBook reader device 100 of FIG. 1, and providing power to the active accessory. Operation 902 depicts a user attaching an accessory light 112 to an electronic device with a first hook 302 and a curved second hook 402, each of which engage a complementary slot within the eBook reader device 100.

Operation 904 shows the power and data provisioning module 114 determining that the active accessory requires power from the electronic device. For example, this may include detecting a short across the ground contact 408 and the detect contact 410 in the second accessory connector 106.

Operation 906 depicts the power and data provisioning module 114 establishing an electrical connection between the eBook reader device 100 and the accessory light 112 via the first accessory connector 104 and the second accessory connector 106. Once the electrical connection has been established, the accessory light 112 may now be used, drawing power from the battery 230 within the eBook reader device 100. In some implementations, a data connection may also be established, as described next with respect to FIG. 10.

Figure 10:
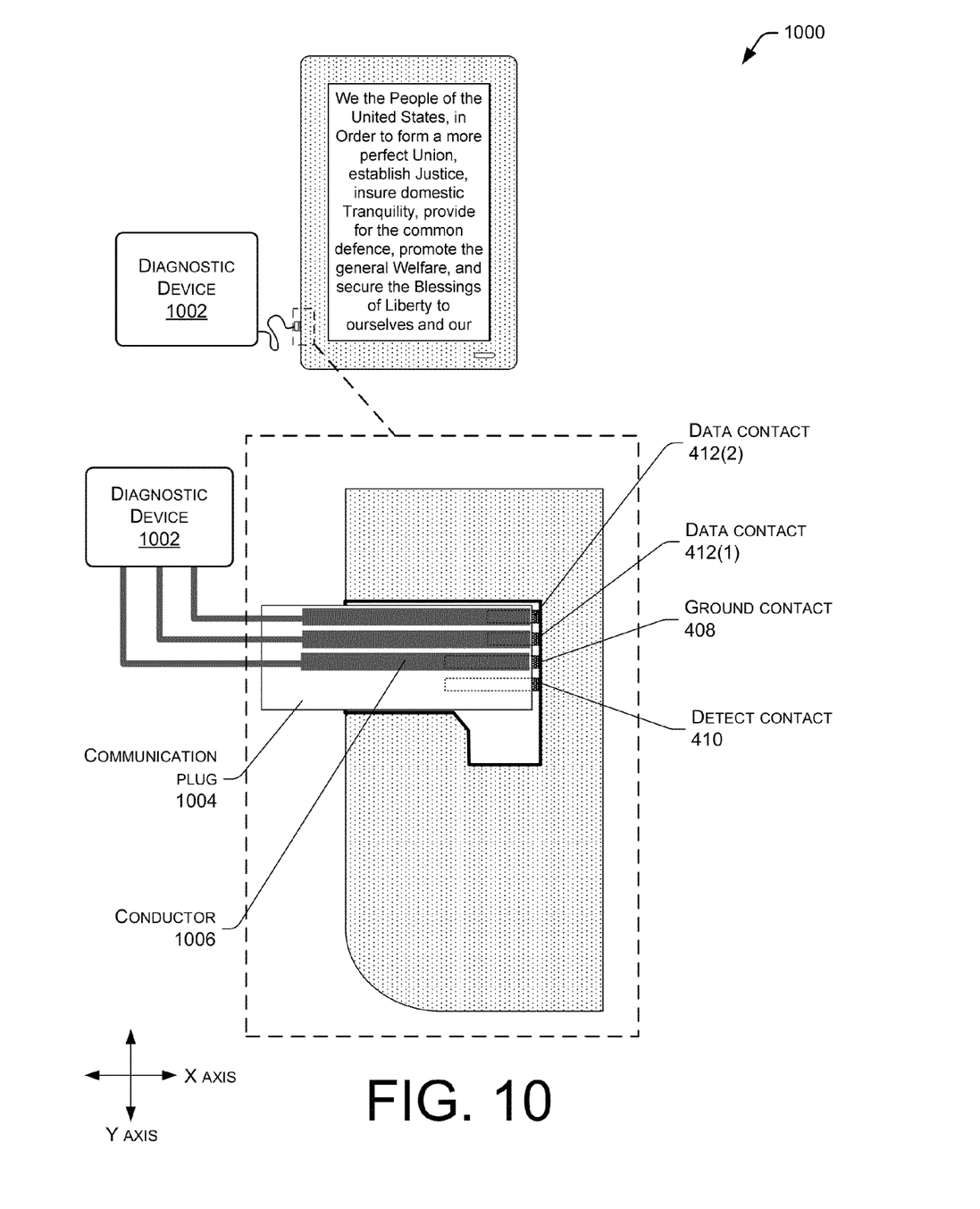
FIG. 10 depicts an enlarged cutaway view of the second accessory connector of the eBook reader device of FIG. 1 with an engaged communication connector.

FIG. 10 depicts an enlarged cutaway view 1000 of the second accessory connector 106 of the eBook reader device 100 of FIG. 1 with a communication plug engaged. Accessory devices may communicate with the eBook reader device 100. For example, a touchpad within the accessory cover 110 may communicate to transmit user input to the eBook reader device 100, or a diagnostic or testing device may communicate with the device to complete checks on the device or to otherwise interact with the hardware and/or software of the eBook reader device 100. In some implementations, this communication may take place via a serial connection, although other connection types may also be utilized.

In some instances, dedicated physical communication port connectors, such as RS-232 serial ports, are difficult or costly to incorporate into small devices. While many system-on-a-chip designs, such as the Freescale i.MX from Freescale Semiconductor of Austin, Tex., incorporate one or more serial controllers, installation of the physical connectors on the electronic device may not be desirable or even possible due to size constraints. For example, the physical connector may add cost, add bulk, add otherwise undesirable penetrations to the enclosure 102, and so forth.

As shown in this illustration, the second accessory connector 106 is configured to provide communications connectivity to a diagnostic device 1002 via a communication plug 1004 that is inserted into the second slot 402. Upon insertion, the communication plug 1004 is configured to electrically engage at least a portion of the contacts disposed within the second slot 402 of the second accessory connector 106. The illustrated diagnostic device does not require power and, thus, the ground contact 408 and the detect contact 410 are not shorted. However, the communication plug 1004 is configured with conductors 1006 which are configured to electrically couple with the contacts. This establishes a plurality of electrical pathways between the eBook reader device 100 and the diagnostic device 1002.

The power and data provisioning module 114 is configured to detect the connection of a communication device to the contacts within the second accessory connector 106. Upon such detection, the power and data provisioning module 114 enables the data connectivity.

Figure 11:
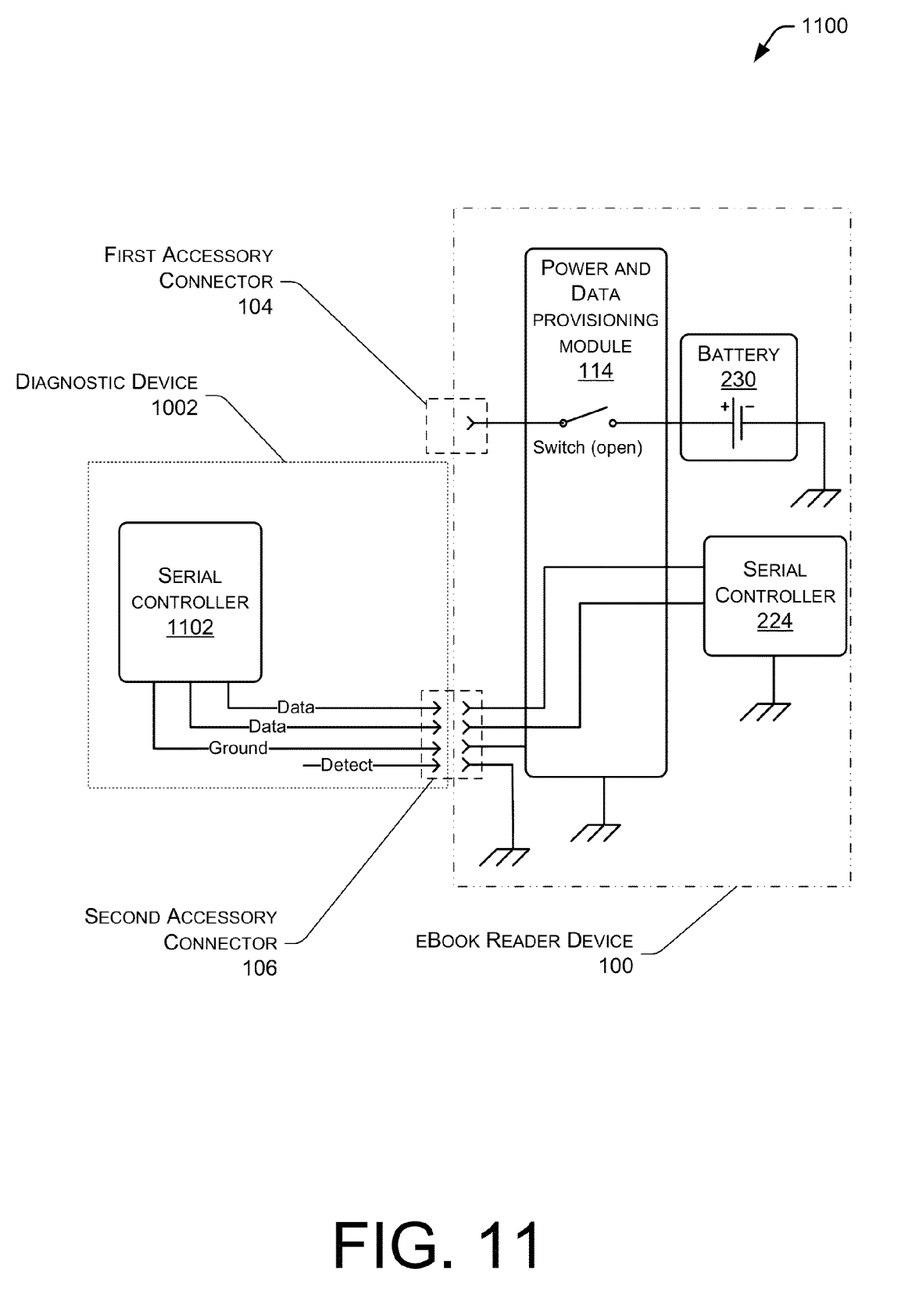
FIG. 11 is an illustrative schematic of a diagnostic device accessory attached to the eBook reader device of FIG. 1.

FIG. 11 is an illustrative schematic 1100 of the diagnostic device 1002 accessory having a serial controller 1102 for communication with the eBook reader device 100 to be diagnosed. The diagnostic device 1002 thus attaches to the eBook reader device of FIG. 1. The diagnostic device 1002 requires data connectivity but in this example does not use power from the eBook reader device 100. The power and data provisioning module 114 senses no short between the ground contact 408 and the detect contact 410 by the communication plug 1004. As a result, the power and data provisioning module 114 does not provide power to the first accessory connector 104, as indicated by an open switch in this schematic. Furthermore, the power and data provisioning module 114 enables the ground contact 408 and data contacts 412(1)-(2) within the second accessory connector 106. The contacts in turn couple to a communication controller, such as the serial controller 224. In other implementations, the communication controller may provide a parallel, universal serial bus (USB), or other communication bus for data transfer via one or more accessory connectors.

Figure 12:
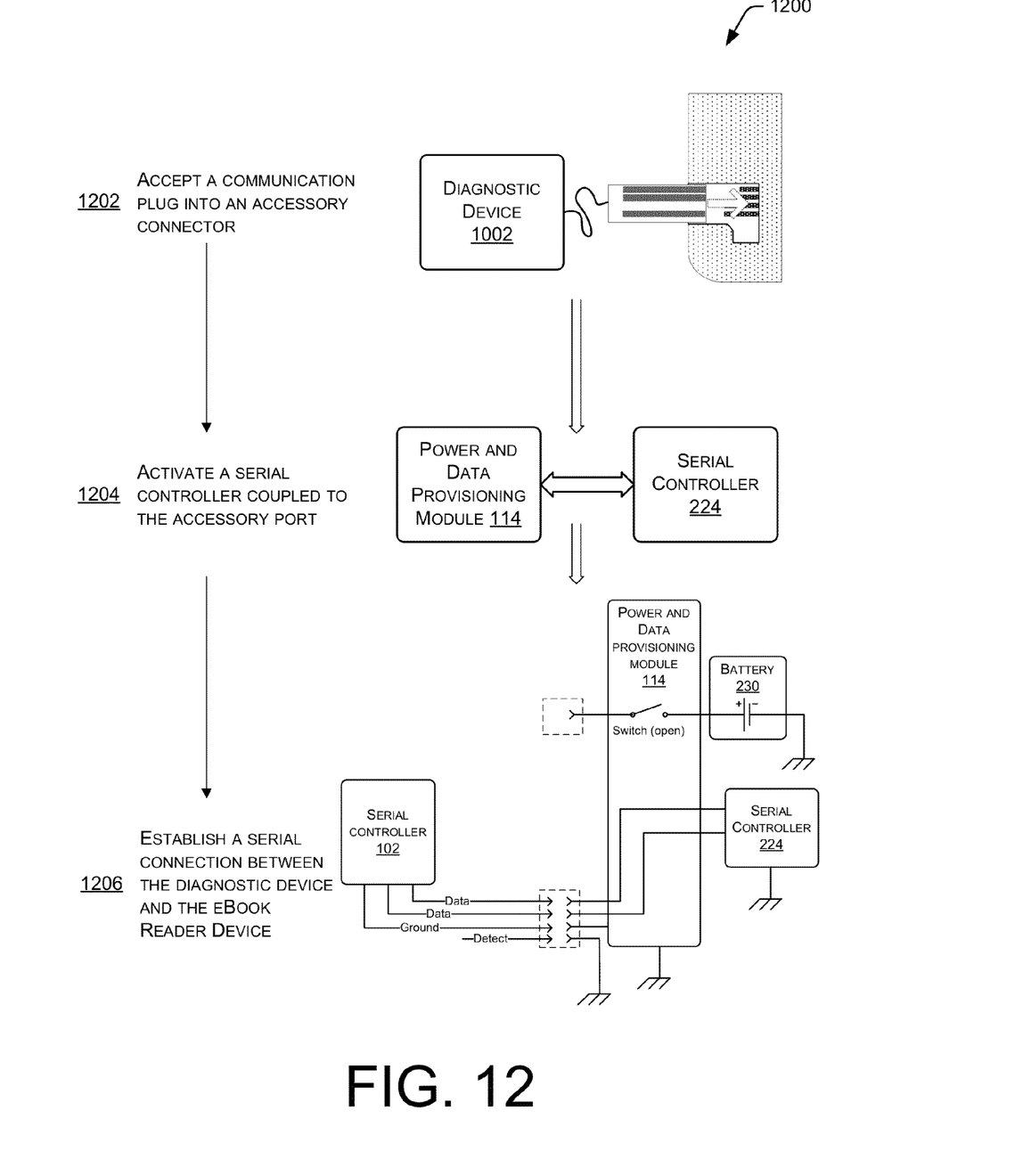
FIG. 12 is an illustrative process of establishing a serial connection between the eBook reader device of FIG. 1 and a diagnostic device.

FIG. 12 is an illustrative process 1200 of establishing a serial connection between the eBook reader device 100 of FIG. 1 and a diagnostic device 1002. Operation 1202 shows an eBook reader device 100 accepting a diagnostic plug 1004 into an accessory connector such as the second accessory connector 106. Once accepted, the communication plug 1002 establishes one or more electrical pathways between the eBook reader device 100 and the diagnostic device 1002.

Operation 1204 shows the power and data provisioning module 114 activating a serial controller coupled to the accessory port. Operation 1206 depicts the serial controller 224 within the eBook reader device 104 establishing a data connection with the diagnostic device 1002. Once established, the diagnostic device 1002 may transfer data to and/or from the eBook reader device 100. For example, the diagnostic device 1002 may initiate tests of hardware within the eBook reader device 100 and retrieve test results there from.

Providing an accessory connector that provides a mechanical connection and an electrical connection reduces the number of extra ports present on the device and the number of penetrations in the enclosure 102. Furthermore, during testing and repair operations, technicians are able to more easily perform diagnostics without having to open the enclosure 102 to gain access to an internal diagnostic connection.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims For example, the methodological acts need not be performed in the order or combinations described herein, and may be performed in any combination of one or more acts.

What is claimed is:

1. An accessory connector for use in a portable electronic device, comprising:
   a connector body comprising at least one mechanical interface surface configured to mechanically engage with an arcuate engagement member; and
   a plurality of electrical contacts disposed within the connector body, the plurality of electrical contacts disposed to:
      electrically engage at least one complementary conductor of the arcuate engagement member when the arcuate engagement member mechanically engages to the mechanical interface surface; and
      refrain from electrically engaging at least one other complementary conductor of the arcuate engagement member when the arcuate engagement member mechanically engages to the mechanical interface surface.

2. The connector of claim 1, wherein at least two of the plurality of electrical contacts disposed within the connector body are substantially parallel to one another and substantially coplanar to one another.

3. The connector of claim 1, wherein at least one of the plurality of electrical contacts disposed within the connector body is longer than each other electrical contact disposed within the connector body.

4. The connector of claim 1, wherein the at least one mechanical interface surface comprises a portion of a slot within the connector body.

5. The connector of claim 1, wherein an entry for the arcuate engagement member to the connector comprises a slot less than eight millimeters wide and less than one millimeter high.

6. The connector of claim 1, wherein the connector body comprises a glass-reinforced plastic.

7. The connector of claim 1, wherein the contacts comprise spring contacts.

8. The connector of claim 1, wherein the electrical contacts are configured as a ground, a detect, a data transmit, and a data receive.

9. A connector assembly of a portable electronic device comprising:
   a first accessory connector having at least one electrical contact disposed therein and configured to accept a first hook of an accessory mount configured to couple to an active accessory of the portable electronic device; and
   a second accessory connector configured to accept a second hook or a plug and comprising a plurality of electrical contacts disposed therein, the second accessory connector being fixedly joined to the first accessory connector, the plurality of electrical contacts disposed such that:

at least a first contact of the plurality of electrical contacts electrically engages a first conductor associated with the second hook or the plug when the second hook or the plug is engaged to the second accessory connector; and the plurality of electrical contacts refrain from electrically engaging a second conductor associated with the second hook or the plug when the second hook or the plug is engaged to the second accessory connector.

10. The connector assembly of claim 9, wherein at least one of the plurality of electrical contacts of the second accessory connector is configured to engage upon insertion of the second hook or the plug into the second accessory connector.

11. The connector assembly of claim 9, wherein the second accessory connector is configured to accept the second hook, and wherein the second hook is configured as an arcuate hook.

12. The connector assembly of claim 9, wherein the at least one electrical contact within the first accessory connector couples to a power source.

13. The connector assembly of claim 9, further comprising a third accessory connector configured to accept a third hook of the accessory mount.

14. The connector assembly of claim 13, the third accessory connector comprising at least one electrical contact disposed therein.

15. A connector assembly of a portable electronic device comprising:
a first accessory connector configured to accept a first engagement member of an accessory mount configured to couple to an active accessory of the portable electronic device; and
a second accessory connector configured to accept a second engagement member or a plug and comprising a plurality of electrical contacts disposed therein, the second accessory connector being fixedly joined to the first accessory connector, the plurality of electrical contacts disposed such that:
at least a first contact of the plurality of electrical contacts electrically engages a first conductor associated with the second engagement member or the plug when the second engagement member or the plug is engaged to the second accessory connector; and
the plurality of electrical contacts refrain from electrically engaging a second conductor associated with the second engagement member or the plug when the second engagement member or the plug is engaged to the second accessory connector.

16. The connector assembly of claim 15, wherein at least one of the plurality of electrical contacts of the second accessory connector is configured to engage upon insertion of the second engagement member or the plug into the second accessory connector.

17. The connector assembly of claim 15, wherein the second accessory connector is configured to accept the second engagement member, and wherein the second engagement member is configured as an arcuate hook.

18. The connector assembly of claim 15, wherein the at least one electrical contact within the first accessory connector couples to a power source.

19. An assembly comprising:
a connector assembly of a portable electronic device comprising:
a first accessory connector having at least one first electrical contact disposed therein and configured to accept a first hook of an accessory mount configured to couple to an active accessory of the portable electronic device; and
a second accessory connector configured to accept a second hook of the accessory mount or a plug and comprising a plurality of second electrical contacts disposed therein, the second accessory connector being fixedly joined to the first accessory connector, the second accessory connector being configured to accept the second hook to couple the accessory mount to the portable electronic device by mechanically engaging the second accessory connector to the second hook and to establish, when mechanically engaged to the second hook, at least one electrically conductive pathway between the accessory mount and the portable electronic device, the plurality of second electrical contacts disposed such that:
at least a first contact of the plurality of second electrical contacts electrically engages a first conductor associated with the second hook or the plug when the accessory mount is coupled to the portable electronic device; and
the plurality of second electrical contacts refrain from electrically engaging a second conductor associated with the second hook or the plug when the accessory mount is coupled to the portable electronic device.

20. The assembly of claim 19, wherein:
the at least one electrically conductive pathway is at least one first electrically conductive pathway; and
the first accessory connector is configured to accept the first hook to couple the accessory mount to the portable electronic device by mechanically engaging the first accessory connector to the first hook and to establish, when mechanically engaged, at least one second electrically conductive pathway between the accessory mount and the portable electronic device.

21. The assembly of claim 20, further comprising the accessory mount comprising:
a body comprising a plurality of third electrically conductive pathways between an active accessory and at least the at least one first electrically conductive pathway and the second electrically conductive pathway;
the first hook moveably attached to the body; and
the second hook.

22. The assembly of claim 21, further comprising the active accessory coupled to a body of the accessory mount and configured to provide power to or consume power from the portable electronic device via the first electrically conductive pathway, the second electrically conductive pathway and the third electrically conductive pathways when the first and second hooks are mechanically engaged, respectively, with the first and second accessory connectors of the portable electronic device.

23. The assembly of claim 22, wherein the active accessory comprises a battery, a display, a touch sensor, a solar panel, a fuel cell, a processor, a memory device, or a light.

24. The assembly of claim 19, wherein the at least one electrically conductive pathway between the accessory mount and the portable electronic device comprises a ground contact, a detect contact, a data transmit contact, a data receive contact, or a combination thereof.

25. The assembly of claim 19, wherein the second accessory connector is configured to accept the plug to couple an active device to the portable electronic device by mechanically engaging the second accessory connector to the plug and to establish, when mechanically engaged to the plug, at least one electrically conductive pathway between the active device and the portable electronic device.

26. The assembly of claim 25, wherein the at least one electrically conductive pathway between the active device and the portable electronic device comprises a ground contact, a detect contact, a data transmit contact, a data receive contact, or a combination thereof.

27. The assembly of claim 25, wherein the at least one electrically conductive pathway includes at least one electrically conductive pathway configured to carry data communication between the active device and the portable electronic device.

28. A connector assembly of a portable electronic device comprising:

a first accessory connector configured to accept a first engagement member of an accessory mount configured to couple to an active accessory of the portable electronic device; and a second accessory connector configured to accept a second engagement member of the accessory mount or a plug and comprising a plurality of electrical contacts disposed therein, the second accessory connector being fixedly joined to the first accessory connector to establish, when mechanically engaged to the second engagement member, at least one electrically conductive pathway between the second engagement member and the portable electronic device, the plurality of electrical contacts disposed such that:

at least a first contact of the plurality of electrical contacts electrically engages a first conductor associated with the second engagement member or the plug when the second engagement member or the plug is engaged to the second accessory connector; and the plurality of electrical contacts refrain from electrically engaging a second conductor associated with the second engagement member or the plug when the second engagement member or the plug is engaged to the second accessory connector.

29. The connector assembly of claim 28, wherein the second accessory connector is configured to accept the second engagement member configured as an arcuate hook.

30. The connector assembly of claim 28, wherein:

the at least one electrically conductive pathway is at least one first electrically conductive pathway; and the first accessory connector is configured to accept the first engagement member configured as a barbed member and is configured to establish at least one second electrically conductive pathway with the first engagement member.

31. The connector assembly of claim 28, wherein the second accessory connector is configured to accept the second engagement member configured as an arcuate hook such that a portion of the plurality of contacts of the second accessory connector engage the arcuate second engagement member.

32. The connector assembly of claim 28, wherein the at least one electrically conductive pathway comprises a ground, a data transmit, a data receive, or a combination thereof.

* * * * *